J. F. McGROTHER AND J. S. DEEN.
AUTOMOBILE LIGHT.
APPLICATION FILED MAY 8, 1920.
1,376,822.
Patented May 3, 1921.
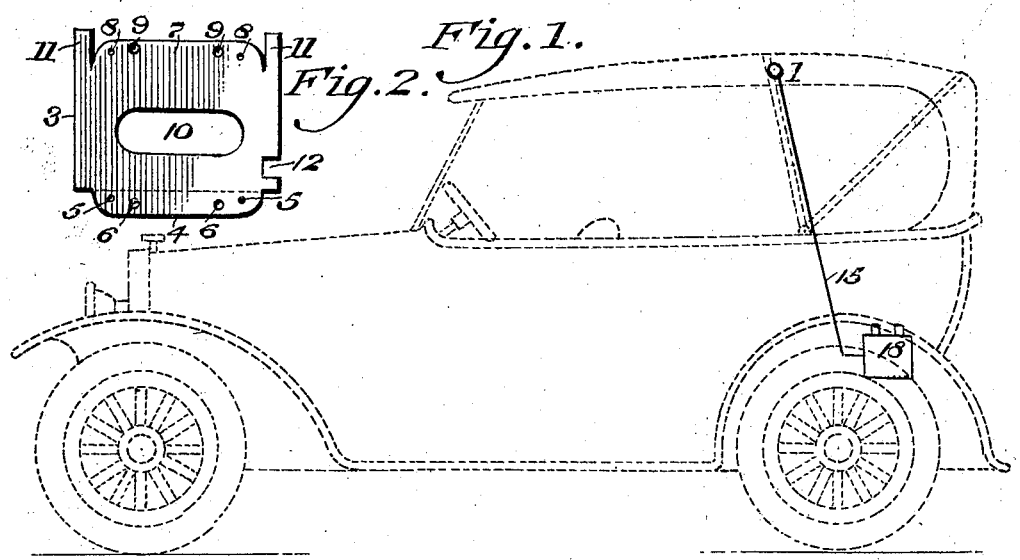
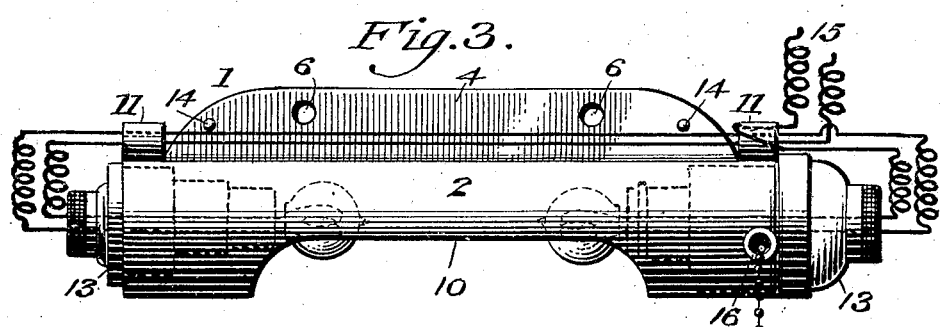
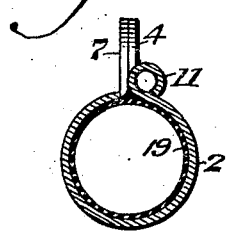 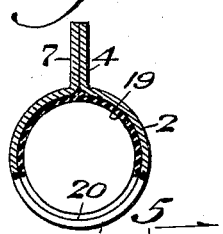 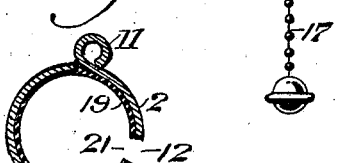
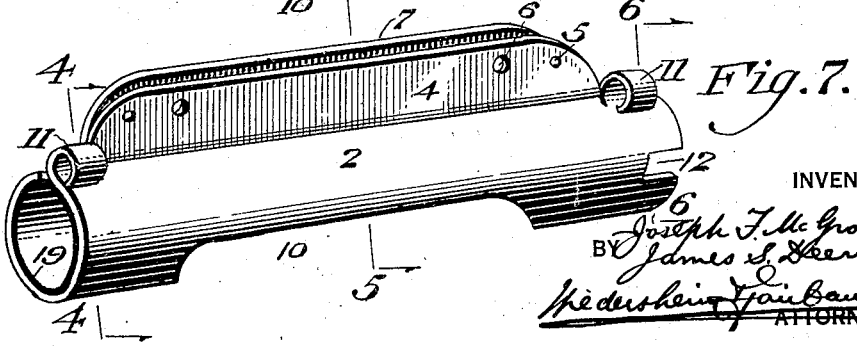
INVENTOR
Joseph F. McGrother,
BY James S. Deen.
ATTORNEYS

UNITED STATES PATENT OFFICE.

JOSEPH F. McGROTHER AND JAMES S. DEEN, OF PHILADELPHIA, PENNSYLVANIA.

AUTOMOBILE-LIGHT.

1,376,822.     Specification of Letters Patent.     Patented May 3, 1921.

Application filed May 8, 1920. Serial No. 379,781.

*To all whom it may concern:*

Be it known that we, JOSEPH F. MC-GROTHER and JAMES S. DEEN, both citizens of the United States, residing in the city and county of Philadelphia, State of Pennsylvania, have invented a new and useful Automobile-Light, of which the following is a specification.

Our present invention relates to a light which is especially adapted and designed for use in conjunction with automobiles of the open top type in contradistinction with those of the sedan type. It is customary in automobiles of the sedan type to provide them with a light in the top or ceiling but in cars of the open top type in so far as we are aware, nothing has been devised for properly lighting the interior of the car such as is advantageous in case wherein the occupants desire to read or to find and remove tools and the like from the compartment which is customarily provided beneath the rear seat.

If trouble occurs at night and it is necessary to remove the tools from the compartment beneath the rear seat it is difficult to find them in the dark and considerable bother and annoyance is occasioned by the necessity of connecting up a trouble light which a great many drivers do not even carry in their automobile.

With the above ends in view our invention consists of a novel construction and arrangement of a light which is readily attachable to a cross bow of the top and which is constructed in such a manner that the light is thrown downwardly in such a direction that it will not interfere with the proper operation of the car by the driver.

Our invention further comprehends a novel construction of a casing which is preferably made from a blank of sheet metal and formed in such a manner that when it is assembled it will retain in fixed position one or more electric light sockets which are wired in series and provided with a manually operated switch to control them.

It further comprehends a novel construction of a light casing which is provided in any desired manner with a reflecting surface and which is formed of an integral sheet of material portions of which are deflected to form conductor retainers and other portions of which are deflected in order to adapt it to be readily secured to a fixed portion of the top such as for example a cross bow.

Other novel features of construction and advantage will hereinafter appear from the detailed description of our invention.

For the purpose of illustrating our invention, we have shown in the accompanying drawing a typical embodiment thereof which is at present preferred by us, since said embodiment will be found in practice to give satisfactory and reliable results. It is, however, to be understood that the various instrumentalities of which our invention consists can be variously arranged and organized and that our invention is not limited to the precise arrangement and organization of these instrumentalities as herein shown and described.

Figure 1 represents diagrammatically an automobile of the open top type in conjunction with which an automobile light embodying our invention is employed.

Fig. 2 represents the punched blank which when bent into proper position forms the casing of the light.

Fig. 3 represents in front elevation and in detached position an automobile light embodying our invention.

Fig. 4 represents a section on line 4—4 of Fig. 7.

Fig. 5 represents a section on line 5—5 of Fig. 7.

Fig. 6 represents a section on line 6—6 of Fig. 7.

Fig. 7 represents in perspective and in detached position the casing of the light as it appears when bent into position and before the light sockets have been secured in position.

Similar numerals of reference indicate corresponding parts.

Referring to the drawing—

1 designates an automobile light embodying our invention. The light is provided with a casing 2 which is formed from a blank of sheet metal and is preferably died out from such blank into the shape seen in Fig. 2 from which it will be seen that the sheet of material 3 is formed with a flange or pin 4 at one end provided with a desired number of apertures 5 and a desired number of apertures 6. The opposite edge of the died out blank 3 is formed with a flange or pin 7 having the desired number of apertures 8 and the desired number of apertures 9. The blank is formed with an oblong aperture 10. The blank is also provided with the tongues 11 at opposite sides and with a recess 12 opening through one of the sides. After the blank sheet of material has been formed as shown in Fig. 2, it is next given the form seen in Fig. 7 by bending it to shape preferably around the mandrel. The tongues 11 are deflected upon themselves with their free ends in close proximity to the body portion of the casing so as to form conductor retaining means. A casing is thus provided as seen in Fig. 7 the body portion of which is preferably cylindrical with outwardly extending pins or flanges 4 and 7, respectively, with their apertures in register.

The light sockets 13 with their bulbs are now inserted through the opposite ends of the body portion of the casing and the casing is secured in clamped position around such light socket by means of the rivets 14 which pass through the apertures 5. The conductor 15 is arranged in series with the light and the sleeve 16 through which passes the switch cable 17 is seated in the recess 12 in the body portion. The conductors 15 are connected to a source of electric supply such as for example the usual battery 18 which is carried by the automobile and may be a battery of the dry cell type or may be one of the type which is automatically charged by the engine of the automobile. The electric light is secured to a cross bow of the top by means of suitable fastening devices passing through the apertures 6 so that the casing is secured in such position that the opening 10 is at the bottom and the casing is of such form that the light will be directed downwardly into the tonneau in such a manner that it will not interfere with the operator of the automobile.

The interior of the casing 2 may be provided in any desired manner with a reflecting surface but I preferably employ a sleeve 19, see more particularly Figs. 4 to 6 inclusive, said sleeve being cut away at its bottom, as indicated at 20, in order to conform to the opening 10, and being provided with a recess 21 which registers with the recess 12.

The conductors preferably are attached to one of the vertical bows so that they will be inconspicuous. When it is desired to use a light all that it is necessary to do is to actuate the cable 17 to operate the pull-switch to effect the closing of the circuit and in the same manner the circuit is opened so that the incandescent bulbs may be lighted or extinguished as desired.

It will be apparent that an automobile light constructed in accordance with our present invention does not interfere with the folding down of the top so that it is not necessary to detach it when the top is raised or lowered.

Our device may be cheaply and economically manufactured and has been found in practice to give very advantageous results and to be a great convenience on an automobile of the open top type, so that in so far as the lighting is concerned the same advantages are present as in the case of a sedan, for example, or a closed car in which the ceiling light forms a permanent part of the equipment.

If more than one light is employed they are preferably arranged in series as shown although, as is apparent, it is within the scope of our invention to employ a separate switch for each light socket if desired.

It will of course be apparent that the reflecting surface may be formed by painting or enameling the interior of the casing 2 or by placing a polished or nickel sleeve within the casing.

It will now be apparent that we have devised a novel and useful construction of an automobile light which embodies the features of advantage enumerated as desirable in the statement of the invention and the above description, and while we have, in the present instance, shown and described a preferred embodiment thereof which will give in practice satisfactory and reliable results, it is to be understood that said embodiment is susceptible of modification in various particulars without departing from the spirit or scope of the invention or sacrificing any of its advantages.

Having thus described our invention what we claim as new and desire to secure by Letters Patent, is:—

1. An electric light for automobiles, comprising a light socket, a casing shaped from sheet material to receive said socket and having its free edges at opposite sides of the sheet deflected to form flanges adapted to be secured to a fixed portion of the automobile, and fastening devices engaging said flanges to maintain formation of said casing, said casing having a cut out portion at its bottom.

2. An electric light for automobiles, comprising a light socket, a casing shaped from sheet material to receive said socket and having its free edges at opposite sides of the sheet deflected to form flanges adapted to be secured to a fixed portion of the automobile, and fastening devices engaging said flanges to clamp said casing around said socket, said casing having a cut out portion at its bottom.

3. An electric light for automobile tops, comprising an electric light socket, a casing shaped from sheet material to receive said socket having its free edges at opposite sides of the sheet deflected to form flanges adapted to be secured to a fixed portion of the automobile and having deflected tongues to form conductor retainers, and fastening devices engaging said flanges to maintain formation of said casing, said casing having a cut out portion in its bottom.

4. An electric light for automobile tops, comprising a casing shaped from sheet material and having its free edges at opposite sides of the sheet deflected to form flanges adapted to be secured to a fixed portion of the automobile and having tongues deflected to form conductor retainers, and having a recess opening through one of its walls, an electric light socket within said casing provided with a sleeve seated in said recess, and fastening devices passing through said flanges to maintain formation of said casing.

5. An electric light for automobiles, comprising a light socket, a casing shaped from sheet material to receive said socket and having its free edges at opposite sides of the sheet deflected to form flanges adapted to be secured to a fixed portion of the automobile, and fastening devices engaging said flanges to maintain formation of said casing, said casing having a cut out portion at its bottom, a light reflector within said casing.

JOSEPH F. McGROTHER.
JAMES S. DEEN.

Witnesses:
EDWARD McGROTHER,
MARY McGROTHER.